US012753075B2

(12) United States Patent
Sasaki et al.

(10) Patent No.: US 12,753,075 B2
(45) Date of Patent: Oct. 6, 2026

(54) BORON NITRIDE PARTICLES, RESIN COMPOSITION, AND METHOD FOR PRODUCING RESIN COMPOSITION

(71) Applicant: Denka Company Limited, Tokyo (JP)

(72) Inventors: Yusuke Sasaki, Tokyo (JP); Kenji Miyata, Tokyo (JP); Michiharu Nakashima, Tokyo (JP)

(73) Assignee: Denka Company Limited, Tokyo (JP)

( * ) Notice: Subject to any disclaimer, the term of this patent is extended or adjusted under 35 U.S.C. 154(b) by 739 days.

(21) Appl. No.: 18/041,860

(22) PCT Filed: Aug. 19, 2021

(86) PCT No.: PCT/JP2021/030447
§ 371 (c)(1),
(2) Date: Feb. 16, 2023

(87) PCT Pub. No.: WO2022/039236
PCT Pub. Date: Feb. 24, 2022

(65) Prior Publication Data

US 2023/0294991 A1 Sep. 21, 2023

(30) Foreign Application Priority Data

Aug. 20, 2020 (JP) ................................ 2020-139479

(51) Int. Cl.
*C01B 21/064* (2006.01)
*C08K 7/24* (2006.01)
*C09C 3/04* (2006.01)

(52) U.S. Cl.
CPC ............ *C01B 21/0645* (2013.01); *C08K 7/24* (2013.01); *C09C 3/041* (2013.01); *C01P 2002/72* (2013.01); *C01P 2004/03* (2013.01); *C01P 2004/10* (2013.01); *C08K 2201/004* (2013.01)

(58) Field of Classification Search
None
See application file for complete search history.

(56) References Cited

U.S. PATENT DOCUMENTS

2015/0152251 A1 6/2015 Koshida et al.
2017/0133120 A1 5/2017 Sherman et al.
2019/0276310 A1 9/2019 Liu et al.

FOREIGN PATENT DOCUMENTS

CN 101633498 A 1/2010
CN 104470873 A 3/2015
CN 106856240 A 6/2017
JP 2004-255252 A 9/2004
JP 5689985 B2 3/2015
(Continued)

OTHER PUBLICATIONS

English translation of Bando et al. (JP 2004-161561) (Year: 2004).*
(Continued)

*Primary Examiner* — Ronak C Patel
(74) *Attorney, Agent, or Firm* — Leydig, Voit & Mayer, Ltd.

(57) ABSTRACT

A boron nitride particle having a bent shape. A resin composition containing the boron nitride particle and a resin. A method for producing a resin composition including a step of preparing the boron nitride particle and a step of mixing the boron nitride particle with a resin.

5 Claims, 5 Drawing Sheets

(56) References Cited

FOREIGN PATENT DOCUMENTS

| | | | |
|---|---|---|---|
| JP | 2016-160134 | A | 9/2016 |
| JP | 2016-216271 | A | 12/2016 |
| JP | 6625308 | B | 12/2019 |
| WO | WO 2014/003193 | A1 | 1/2014 |
| WO | WO 2020/031913 | A1 | 2/2020 |

OTHER PUBLICATIONS

English translation of Ishida (JP 2017-094542) (Year: 2017).*
English translation of Nakagawa et al. (WO 2020/031913). (Year: 2020).*
Ban Xiao-lei, "Efficient Synthesis and Characterization of Boron Nitride Nanotubes", *Journal of Synthetic Crystals* vol. 42, No. 6, p. 1138-p. 1142 (Jun. 30, 2013).
The International Bureau of WIPO, International Preliminary Report on Patentability issued in International Patent Application No. PCT/JP2021/030447 (Mar. 2, 2023).
Japan Patent Office, Office Action issued in Japanese Patent Application No. 2022-544003 (Oct. 4, 2022).
Japan Patent Office, International Search Report issued in International Application No. PCT/JP2021/030447 (Sep. 14, 2021).

* cited by examiner

BORON NITRIDE PARTICLES, RESIN COMPOSITION, AND METHOD FOR PRODUCING RESIN COMPOSITION

CROSS-REFERENCE TO RELATED APPLICATIONS

This patent application is the U.S. national phase of International Application No. PCT/JP2021/030447, filed on Aug. 19, 2021, which claims the benefit of Japanese Patent Application No. 2020-139479, filed Aug. 20, 2020, the disclosures of which are incorporated herein by reference in their entireties for all purposes.

TECHNICAL FIELD

The present disclosure relates to boron nitride particles, a resin composition, and a method for producing a resin composition.

BACKGROUND ART

Boron nitride has lubricity, high thermal conductivity and insulating properties and is in use for a variety of uses such as solid lubricating materials, releasing materials, cosmetic raw materials, heat dissipation materials and sintered products having heat resistance and insulating properties. Conventionally, as a boron nitride particle (boron nitride agglomerated particle), in order to suppress the anisotropy of thermal conductivity derived from the crystal structure and the flaky shape of a hexagonal boron nitride particle, an agglomerated particle having a nearly spherical shape, in which a plurality of boron nitride primary particles have agglomerated, is common.

For example, as a hexagonal boron nitride powder that is loaded into a resin to be capable of imparting high thermal conductivity and high dielectric strength to a resin composition to be obtained, Patent Literature 1 discloses a hexagonal boron nitride powder in which an agglomerated particle composed of the primary particles of hexagonal boron nitride is contained, the BET specific surface area is 0.7 to 1.3 $m^2/g$ and an oil absorption that is measured based on JIS K 5101-13-1 is 80 g/100 g or less.

CITATION LIST

Patent Literature

[Patent Literature 1] Japanese Unexamined Patent Publication No. 2016-160134

SUMMARY OF INVENTION

Technical Problem

In a case where a boron nitride particle having a nearly spherical shape is used in, for example, a heat dissipation material, due to the shape, the boron nitride particles in the heat dissipation material do not sufficiently come into contact with each other at all times, and there is room for additional improvement.

A main objective of the present invention is to provide a new boron nitride particle.

Solution to Problem

One aspect of the present invention is a boron nitride particle having a bent shape.

A ratio of a length of a perpendicular line L2 to a length of a straight line L1 is 0.2 or more, in which the straight line L1 is a straight line connecting a point on one end of the boron nitride particle to a point on the other end, and the perpendicular line L2 is a perpendicular line having a maximum length among perpendicular lines connecting the straight line L1 or an extended line of the straight line L1 to a point on the boron nitride particle.

The boron nitride particle may include a first portion extending in a first direction with a length of 50 μm or longer; and a second portion bending from the first portion and extending in a second direction different from the first direction with a length of 50 μm or longer.

The boron nitride particle may have a shell part formed of boron nitride and a hollow part surrounded by the shell part.

Still another aspect of the present invention is a resin composition containing the boron nitride particle and a resin.

Far still another aspect of the present invention is a method for producing a resin composition, including a step of preparing the boron nitride particle and a step of mixing the boron nitride particle with a resin. This method for producing a resin composition may further include a step of pulverizing the boron nitride particle.

Advantageous Effects of Invention

According to one aspect of the present invention, it is possible to provide a new boron nitride particle.

DESCRIPTION OF EMBODIMENTS

Hereinafter, an embodiment of the present invention will be described in detail. One embodiment of the present invention is a boron nitride particle having a bent shape.

While a conventional boron nitride particle has, for example, a nearly spherical shape, the boron nitride particle according to one embodiment has a bent shape. This boron nitride particle has a bent shape, which makes it easy for the boron nitride particle to come into contact with a different boron nitride particle. Therefore, for example, when a heat dissipation material (heat dissipation sheet) has been produced by mixing the boron nitride particles with a resin, it is considered that the boron nitride particles form a three-dimensional heat transfer path and thus the heat dissipation material has excellent thermal conductivity. Therefore, this boron nitride particle can be suitably used for heat dissipation materials. As the use of the boron nitride particle, a heat dissipation material has been exemplified, but this boron nitride particle can be used in a variety of uses without being limited to heat dissipation materials.

Figure 1:
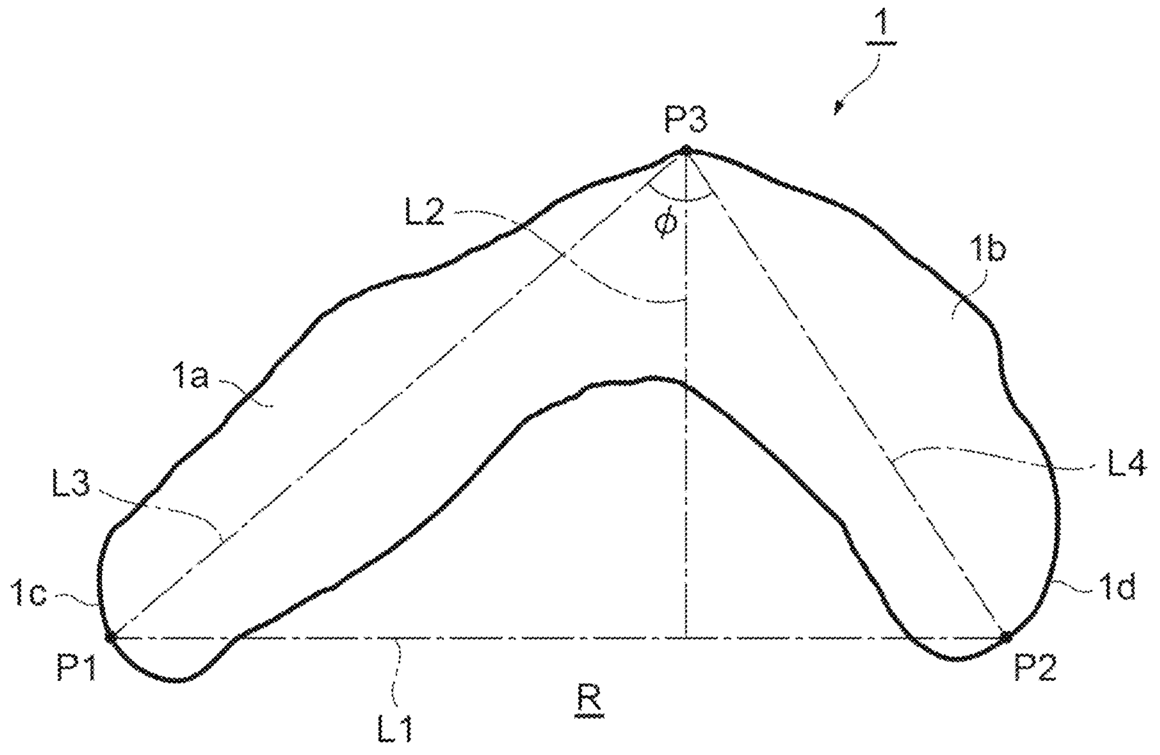
FIG. 1 is a schematic view showing one embodiment of a boron nitride particle.

FIG. 1 is a schematic view showing one embodiment of a boron nitride particle. As shown in FIG. 1, in one embodiment, a boron nitride particle 1 includes, for example, a first portion 1*a* that extends in a first direction and a second portion 1*b* that bends from the first portion 1*a* and extends in a second direction that is different from the first direction. The fact that the boron nitride particle has such a bent shape can be confirmed by observing the boron nitride particle with a scanning electron microscope (SEM). Specifically, on a SEM image of the boron nitride particle 1, when a straight line L1 connecting an arbitrary point P1 on one end (the end of the first portion 1*a*) 1*c* of the boron nitride particle 1 to an arbitrary point P2 on the other end (the end of the second portion 1*b*) 1*d* has been drawn, in a case where it is possible to draw the straight line L1 that passes through a region R where the boron nitride particle 1 is not present as shown in FIG. 1, the boron nitride particle 1 is determined to have a bent shape.

The bending condition of the boron nitride particle can be evaluated with, for example, a bending index that is defined as described below. That is, as shown in FIG. 1, first, on the SEM image of the boron nitride particle 1, a point P3 where the length of a perpendicular line drawn from the above-described straight line L1 or an extended line thereof to a point on the boron nitride particle 1 is maximized is determined, and a perpendicular line L2 is drawn from the point P3 to the straight line L1 or the extended line thereof. At this time, the bending index is defined as the ratio of the length of the perpendicular line L2 to the length of the straight line L1 (bending index=the length of the perpendicular line L2/the length of the straight line L1). The length of the straight line L1 and the length of the perpendicular line L2 may be measured by importing the SEM image into image analyzing software (for example, "Mac-view" manufactured by Mountech Co., Ltd.).

As the bending index increases, it means that the boron nitride particle bends more significantly (at a sharper angle). The bending index of the boron nitride particle may be 0.2 or more, 0.3 or more, 0.4 or more, 0.5 or more, 0.6 or more, 0.7 or more, 0.8 or more, 0.9 or more, 1.0 or more, 1.5 or more, 2.0 or more or 3.0 or more and may be 10 or less, 8.0 or less, 6.0 or less, 5.0 or less or 4.0 or less. While it is possible to draw a plurality of straight lines L1 on one boron nitride particle, if it is possible to draw at least one straight line L1 for which the bending index of the boron nitride particle is in the above-described range, the bending index of the boron nitride particle is considered to be in the above-described range. Hereinafter, what has been described above is true for numerical ranges relating to the straight line L1.

The length of the straight line L1 may be 50 μm or longer, 60 μm or longer, 70 μm or longer, 80 μm or longer, 90 μm or longer, 100 μm or longer, 150 μm or longer, 200 μm or longer or 250 μm or longer and may be 500 μm or shorter or 400 μm or shorter. The length of the perpendicular line L2 may be 30 μm or longer, 40 μm or longer, 50 μm or longer, 60 μm or longer, 70 μm or longer, 80 μm or longer, 90 μm or longer, 100 μm or longer, 150 μm or longer, 200 μm or longer or 250 μm or longer and may be 500 μm or shorter or 400 μm or shorter.

The angle formed by the first portion 1*a* (first direction) and the second portion 1*b* (second direction) may be 20° to 150°. The angle may be 30° or more, 40° or more, 50° or more or 60° or more and may be 140° or less, 120° or less or 100° or less.

The angle formed by the first portion 1*a* (first direction) and the second portion 1*b* (second direction) is defined as described below. That is, as shown in FIG. 1, the point P3 and the point P1 on one end (the end of the first portion 1*a*) 1*c* of the boron nitride particle 1 are connected with a straight line L3, and the point P3 and the point P2 on the other end (the end of the second portion 1*b*) 1*d* are connected with a straight line L4. At this time, an angle $\phi$ formed by the straight line L3 and the straight line L4 is defined as the angle formed by the first portion 1*a* (first direction) and the second portion 1*b* (second direction).

The lengths of the first portion 1*a* and the second portion 1*b* may be each independently 50 μm or longer, 60 μm or longer, 70 μm or longer, 80 μm or longer, 90 μm or longer, 100 μm or longer, 150 μm or longer or 200 μm or longer and may be 500 μm or shorter, 400 μm or shorter or 300 μm or shorter. It is considered that the boron nitride particle 1 has the first portion 1*a* and the second portion 1*b*, which are relatively large, which makes it easy to, when a heat dissipation material has been produced by mixing the boron nitride particle 1 with a resin, match the thickness direction of the heat dissipation material and the first direction or the second direction of the boron nitride particle 1, and thus the thermal conductivity in the thickness direction of the heat dissipation material can be enhanced.

The length of the first portion 1*a* is defined as the length of the above-described straight line L3. The length of the second portion is defined as the length of the above-described straight line L4. The lengths of the first portion 1*a* and the second portion 1*b* may be measured by importing the SEM image into image analyzing software (for example, "Mac-view" manufactured by Mountech Co., Ltd.).

The aspect ratios of the first portion 1*a* and the second portion 1*b* may be each independently 1.1 or more, 1.2 or more, 1.3 or more, 1.4 or more, 1.5 or more, 2.0 or more or 3.0 or more and may be 12.0 or less, 10.0 or less, 9.0 or less, 8.0 or less, 7.0 or less or 6.0 or less.

The aspect ratio of the first portion is defined as the ratio (L3/L5) of the length (L3) of the first portion to a maximum length (L5) in a direction perpendicular to the direction where the above-described length is present. The maximum length (L5) in the direction perpendicular to the direction where the length of the first portion is present can be measured by the same method as for the length (L3) of the first portion. The aspect ratio of the second portion is defined by replacing "the first portion" in the above-described definition with "the second portion".

The boron nitride particle may be solid or hollow. In a case where the boron nitride particle is hollow, the boron nitride particle may have a shell part formed of boron nitride and a hollow part surrounded by the shell part. The hollow part may extend along the bent shape of the boron nitride particle or may have a shape that is an approximately similar shape to the bent shape of the boron nitride particle. In this case, at least one of the end portions of the boron nitride particle may be an open end or all of the end portions may be open ends. The open end may communicate with the above-described hollow part. In a case where the boron nitride particle is hollow, and at least one of the end portions of the boron nitride particle is an open end, for example, when the boron nitride particle is mixed with a resin and used as a heat dissipation material, the resin that weighs less than the boron nitride particle is filled into the hollow part, whereby the weight reduction of the heat dissipation material can be expected while the heat dissipation material has thermal conductivity.

The boron nitride particle may be substantially composed of boron nitride alone. The fact that the boron nitride particle is substantially composed of boron nitride alone can be confirmed from the fact that only a peak derived from boron nitride is detected in X-ray diffraction measurement.

Subsequently, a method for producing the above-described boron nitride particle will be described below. The above-described boron nitride particle can be produced by, for example, a method for producing a boron nitride particle including a step of disposing a mixture and a base material in a container formed of a carbon material, in which the mixture includes boron carbide and boric acid, and the base material is formed of a carbon material (disposition step) and a step of generating a boron nitride particle on the surface of the base material by performing heating and pressurization with a nitrogen atmosphere formed in the container (generation step). Another embodiment of the present invention is such a method for producing a boron nitride particle. A boron nitride particle is generated in a direction approximately perpendicular to the surface of the base material, but it is considered that the surface of the base material on which the boron nitride particle is generated is approximately parallel to the direction of gravitational force, which makes the boron nitride particle bend in the middle of generation due to the influence of the gravitational force, and thus a boron nitride particle having a bent shape can be produced.

The container formed of a carbon material is a container capable of accommodating the mixture and the base material. The container may be, for example, a carbon crucible. The container is preferably a container the airtightness of which can be enhanced by covering an open part with a lid. In the disposition step, for example, the mixture may be disposed on a bottom part of the container, and the base material may be disposed in the container such that the surface on which a boron nitride particle is to be generated and the direction of gravitational force are in the same direction. The disposition place of the base material may be near the center or on a side wall surface as long as the base material is disposed in the container. As the disposition location of the base material becomes closer to the center of the container, a boron nitride particle having a more significantly bent shape is likely to be generated. The base material formed of a carbon material may have, for example, a sheet shape, a plate shape or a rod shape. The base material formed of a carbon material may be, for example, a carbon sheet (graphite sheet), a carbon plate or a carbon rod.

The boron carbide in the mixture may be, for example, in a powder form (boron carbide powder). The boric acid in the mixture may be, for example, in a powder form (boric acid powder). The mixture can be obtained by, for example, mixing a boron carbide powder, a boron nitride powder and a boric acid powder by a well-known method.

The boron carbide powder can be produced by a well-known production method. Examples of the method for producing the boron carbide powder include a method in which boric acid and acetylene black are mixed together and then heated at 1800° C. to 2400° C. for one to 10 hours in an inert gas (for example, nitrogen gas) atmosphere, thereby obtaining a massive boron carbide particle. The boron carbide powder can be obtained by appropriately performing pulverization, shieving, washing, impurity removal, drying and the like on the massive boron carbide particle obtained by this method.

The average particle diameter of the boron carbide powder can be adjusted by adjusting the pulverization time of the massive boron carbide particle. The average particle diameter of the boron carbide powder may be 5 μm or more, 7 μm or more or 10 μm or more and may be 100 μm or less, 90 μm or less, 80 μm or less or 70 μm or less. The average particle diameter of the boron carbide powder can be measured by a laser diffraction and scattering method.

The mixing ratio between the boron carbide and the boric acid can be appropriately selected. From the viewpoint of the boron nitride particle being likely to become large, the content of the boric acid in the mixture is, with respect to 100 parts by mass of the boron carbide, preferably 2 parts by mass or more, more preferably 5 parts by mass or more and still more preferably 8 parts by mass or more and may be 100 parts by mass or less, 90 parts by mass or less or 80 parts by mass or less.

When the content of boric acid in the mixture increases, there is a tendency that a boron nitride particle to be generated becomes larger, and thus there are cases where adjacent boron nitride particles bond together in the middle of the generation of the boron nitride particle and a boron nitride particle having a bent shape is generated.

The mixture containing boron carbide and boric acid may further contain other components. Examples of the other components include silicon carbide, carbon, iron oxide and the like. When the mixture containing boron carbide and boric acid further contains silicon carbide, it becomes easy to obtain a boron nitride particle having no open end.

In the container, for example, a nitrogen atmosphere containing 95 vol % or more of nitrogen gas has been formed. The content of the nitrogen gas in the nitrogen atmosphere is preferably 95 vol % or more and more preferably 99.9 vol % or more and may be substantially 100 vol %. In the nitrogen atmosphere, not only the nitrogen gas but also ammonia gas or the like may be contained.

From the viewpoint of the boron nitride particle being likely to become large, the heating temperature is preferably 1450° C. or higher, more preferably 1600° C. or higher and still more preferably 1800° C. or higher. The heating temperature may be 2400° C. or lower, 2300° C. or lower or 2200° C. or lower.

From the viewpoint of the boron nitride particle being likely to become large, the pressure at the time of the pressurization is preferably 0.3 MPa or higher and more preferably 0.6 MPa or higher. The pressure at the time of the pressurization may be 1.0 MPa or lower or 0.9 MPa or lower.

From the viewpoint of the boron nitride particle being likely to become large, the time for performing the heating and the pressurization is preferably three hours or longer and more preferably five hours or longer. The time for performing the heating and the pressurization may be 40 hours or shorter or 30 hours or shorter.

According to this production method, boron nitride particles are generated on the base material formed of a carbon material. Therefore, boron nitride particles can be obtained by collecting the boron nitride particles on the base material. The fact that the particles generated on the base material are boron nitride particles can be confirmed from the fact that a peak derived from boron nitride is detected when some of the particles are collected from the base material and X-ray diffraction measurement is performed on the collected particles.

A step of classifying the boron nitride particles obtained as described above so that only a boron nitride particle having a maximum length in a specific range can be obtained (classification step) may also be performed.

The boron nitride particle obtained as described above can be mixed with a resin and used as a resin composition. That is, still another embodiment of the present invention is a resin composition containing the boron nitride particle and a resin.

Examples of the resin include an epoxy resin, a silicone resin, silicone rubber, an acrylic resin, a phenolic resin, a melamine resin, a urea resin, an unsaturated polyester, a fluorine resin, a polyimide, a polyamide-imide, polyetherimide, polybutylene terephthalate, polyethylene terephthalate, polyphenylene ether, polyphenylene sulfide, wholly aromatic polyester, polysulfone, a liquid crystal polymer, polyethersulfone, polycarbonate, a maleimide-modified resin, an ABS (acrylonitrile-butadiene-styrene) resin, an AAS (acrylonitrile-acrylic rubber styrene) resin, an AES (acrylonitrile ethylene propylene diene rubber styrene) resin and the like.

In the case of using the resin composition as a heat dissipation material, from the viewpoint of improving the thermal conductivity of the heat dissipation material and easily obtaining excellent heat dissipation performance, the content of the boron nitride particles may be 15 vol % or more, 20 vol % or more, 30 vol % or more, 40 vol % or more, 50 vol % or more or 60 vol % or more based on the total volume of the resin composition. From the viewpoint of suppressing the generation of voids at the time of molding the resin composition into a sheet-like heat dissipation material and being capable of suppressing the degradation of the insulating properties and mechanical strength of the sheet-like heat dissipation material, the content of the boron nitride particles may be 85 vol % or less, 80 vol % or less, 70 vol % or less, 60 vol % or less, 50 vol % or less or 40 vol % or less based on the total volume of the resin composition.

The content of the resin may be appropriately adjusted depending on the use, required characteristics or the like of the resin composition. The content of the resin may be, for example, 15 vol % or more, 20 vol % or more, 30 vol % or more, 40 vol % or more, 50 vol % or more or 60 vol % or more and may be 85 vol % or less, 70 vol % or less, 60 vol % or less, 50 vol % or less or 40 vol % or less based on the total volume of the resin composition.

The resin composition may further contain a curing agent that cures the resin. The curing agent is appropriately selected depending on the kind of the resin. Examples of the curing agent that can be used together with an epoxy resin include phenol novolac compounds, acid anhydrides, amino compounds, imidazole compounds and the like. The content of the curing agent may be, for example, 0.5 parts by mass or more or 1.0 part by mass or more and may be 15 parts by mass or less or 10 parts by mass or less with respect to 100 parts by mass of the resin.

The resin composition may further contain other components. The other components may be a curing accelerator (curing catalyst), a coupling agent, a wetting and dispersing additive, a surface conditioner and the like.

Examples of the curing accelerator (curing catalyst) include phosphorus-based curing accelerators such as tetraphenylphosphonium tetraphenylborate and triphenylphosphate, imidazole-based curing accelerators such as 2-phenyl-4,5-dihydroxymethylimidazole, amine-based curing accelerators such as boron trifluoride monoethylamine and the like.

Examples of the coupling agent include a silane-base coupling agent, a titanate-based coupling agent, an aluminate-based coupling agent and the like. Examples of a chemical bonding group that is contained in these coupling agents include a vinyl group, an epoxy group, an amino group, a methacrylic group, a mercapto group and the like.

Examples of the wetting and dispersing additive include phosphate ester salt, carboxylate ester, polyester, acrylic copolymers, block copolymers and the like.

Examples of the surface conditioner include an acrylic surface conditioner, a silicone-based surface conditioner, a vinyl-based surface conditioner, a fluorine-based surface conditioner and the like.

The resin composition can be produced by, for example, a method for producing a resin composition including a step of preparing the boron nitride particle according to one embodiment (preparation step) and a step of mixing the boron nitride particles with a resin (mixing step). Far still another embodiment of the present invention is such as method for producing a resin composition.

The method for producing a resin composition according to one embodiment may further include a step of pulverizing the boron nitride particle (pulverization step). The pulverization step may be performed between the preparation step and the mixing step or may be performed at the same time as the mixing step (the boron nitride particle may be pulverized at the same time as the mixing of the boron nitride particle with the resin).

The resin composition can be used as, for example, a heat dissipation material. The heat dissipation material can be produced by, for example, curing the resin composition. A method for curing the resin composition is appropriately selected depending on the kind of the resin (and the curing agent that is used as necessary) contained in the resin composition. For example, in a case where the resin is an epoxy resin and the above-described curing agent is used together, the resin can be cured by heating.

EXAMPLES

Hereinafter, the present invention will be more specifically described using examples. However, the present invention is not limited to the following examples.

Example 1

Massive boron carbide particles were pulverized with a pulverizer, and a boron carbide powder having an average particle diameter of 10 μm was obtained. 100 Parts by mass of the obtained boron carbide powder and 9 parts by mass of boric acid were mixed together, the obtained mixture was loaded into a carbon crucible, and a carbon base material (manufactured by Tokai Carbon Co., Ltd.) was disposed at the center of a container of the carbon crucible such that the surface of the base material became approximately parallel to the direction of gravitational force. The carbon crucible covered with a lid was heated in a nitrogen gas atmosphere under conditions of 2000° C. and 0.85 MPa for 20 hours in a resistance heating furnace, whereby particles were generated on the surface of the carbon base material.

Figure 2:
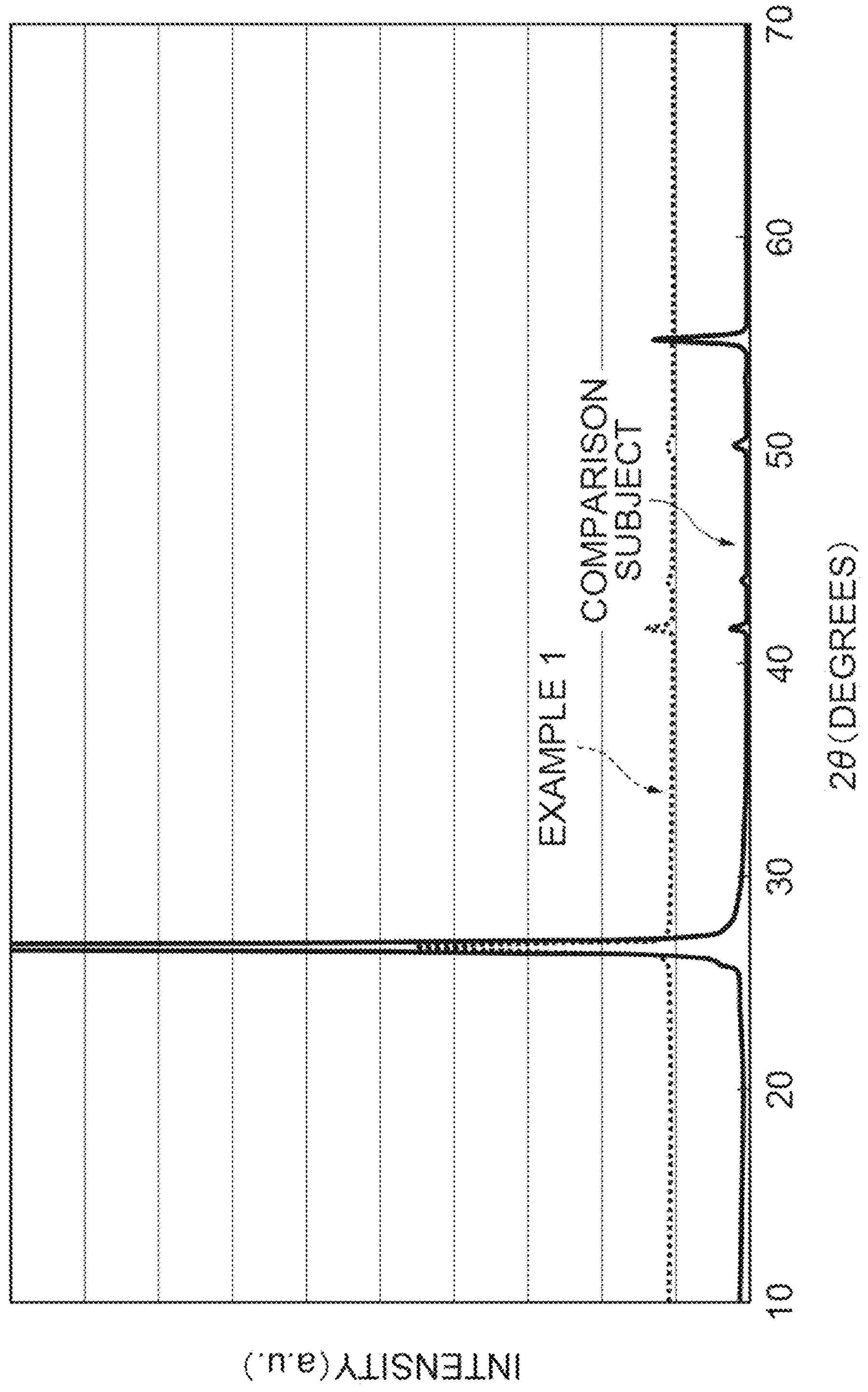
FIG. 2 is a graph of X-ray diffraction measurement results of boron nitride particles of Example 1.
Figure 3:
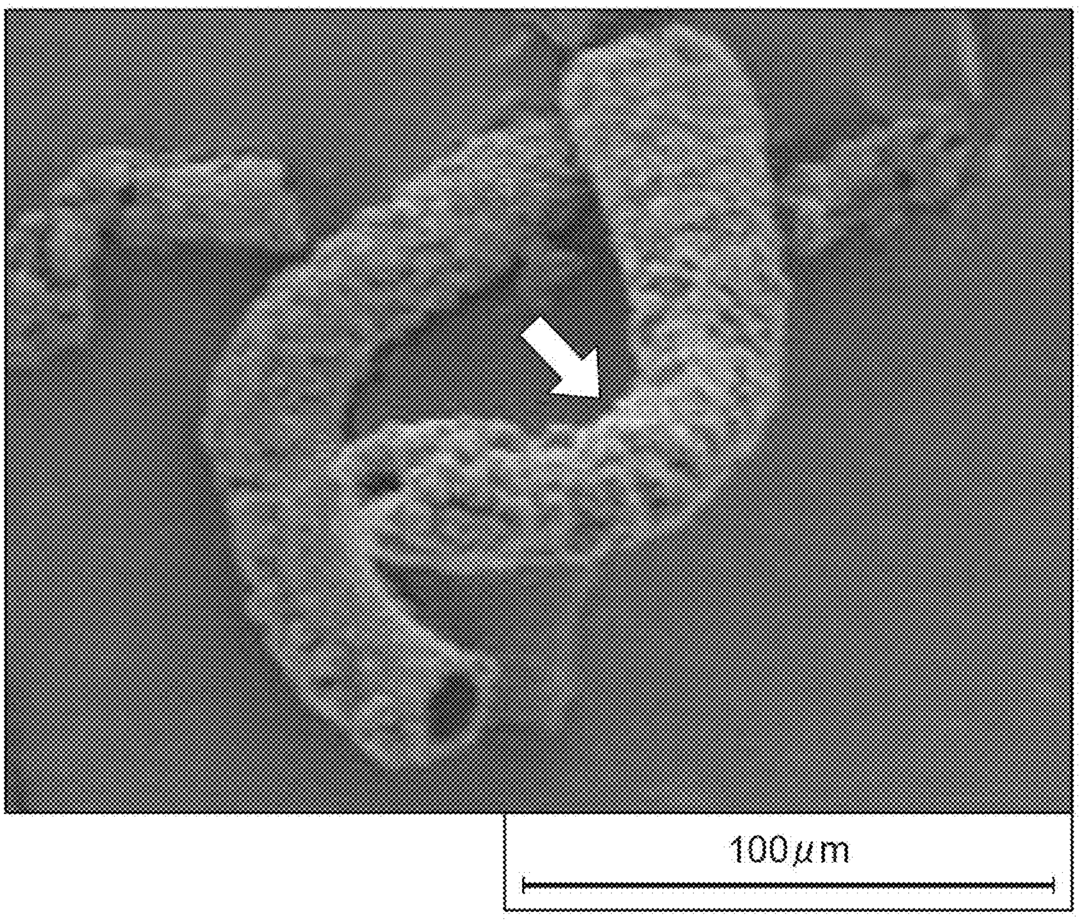
FIG. 3 is a SEM image of the boron nitride particles of Example 1.

Some of the particles generated on the surface of the carbon base material were collected and measured by X-ray diffraction using an X-ray diffractometer ("ULTIMA-IV" manufactured by Rigaku Corporation). This X-ray diffraction measurement result and the X-ray diffraction measurement result of a boron nitride powder (GP grade) manufactured by Denka Company Limited as a comparison subject are each shown in FIG. 2. As is clear from FIG. 2, only a peak derived from boron nitride was detected, and it was possible to confirm that boron nitride particles were generated. A SEM image of the obtained boron nitride particles is shown in FIG. 3. As a result of obtaining straight lines (perpendicular lines) L1 to L4 and an angle $\phi$ shown in FIG. 1 and a bending index (=the length of the perpendicular line L2/the length of the straight line L1) for one of the obtained boron nitride particles (a boron nitride particle indicated by an arrow in FIG. 3), the length of the straight line L1 was 72 μm, the length of the perpendicular line L2 was 63 μm, the length of the straight line L3 was 73 μm, the length of the straight line L4 was 72 μm, the angle ϕ was 60°, and the bending index was 0.88.

Example 2

Figure 4:
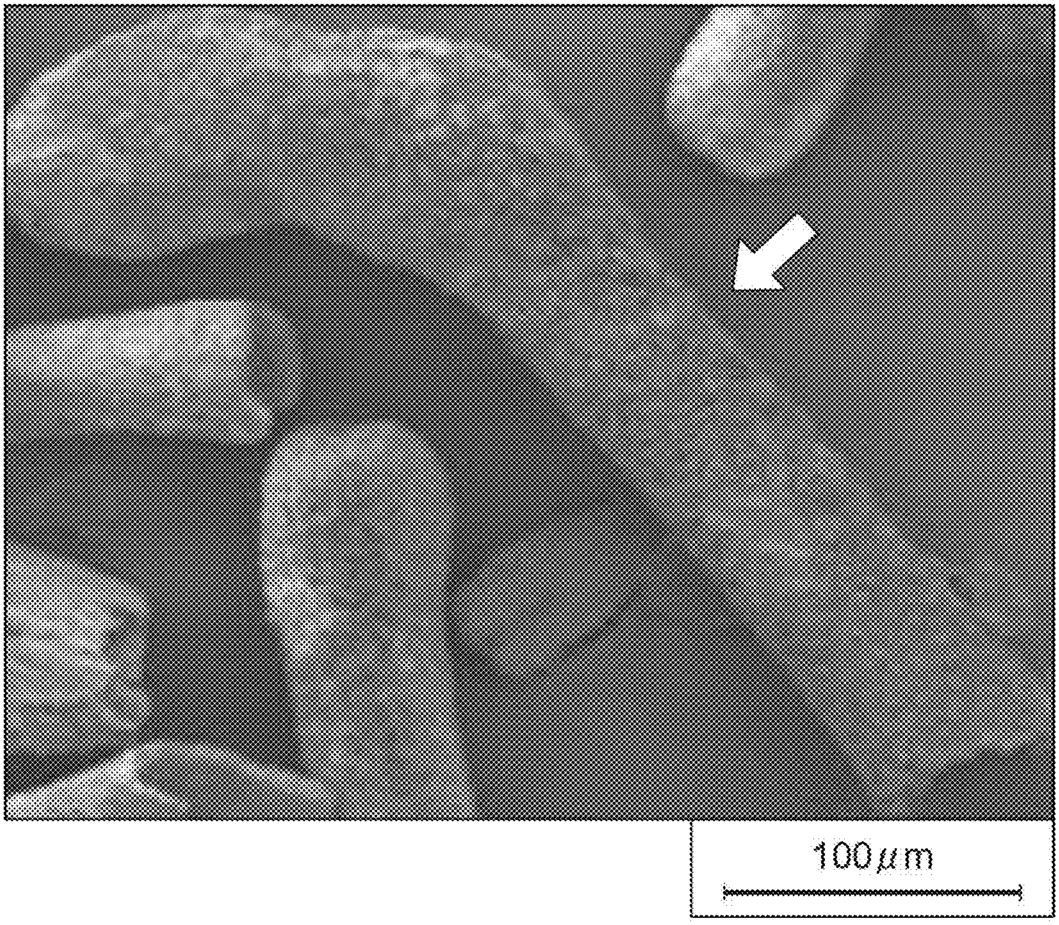
FIG. 4 is a SEM image of boron nitride particles of Example 2.

Particles were generated on the surface of a carbon sheet (manufactured by NeoGraf Solutions) in the same manner as in Example 1 except that the carbon sheet was installed on a side wall surface of the container of the carbon crucible such that the surface of the carbon sheet became approximately parallel to the direction of gravitational force. As a result of collecting some of the particles generated on the surface of the carbon sheet and measuring the particles by X-ray diffraction, only a peak derived from boron nitride was detected, and it was possible to confirm that boron nitride particles were generated. A SEM image of the obtained boron nitride particles is shown in FIG. 4. As a result of obtaining straight lines (perpendicular lines) L1 to L4 and an angle ϕ shown in FIG. 1 and a bending index (=the length of the perpendicular line L2/the length of the straight line L1) for one of the obtained boron nitride particles (a boron nitride particle indicated by an arrow in FIG. 4), the length of the straight line L1 was 348 μm, the length of the perpendicular line L2 was 140 μm, the length of the straight line L3 was 170 μm, the length of the straight line L4 was 288 μm, the angle ϕ was 95°, and the bending index was 0.40.

Example 3

Figure 5:
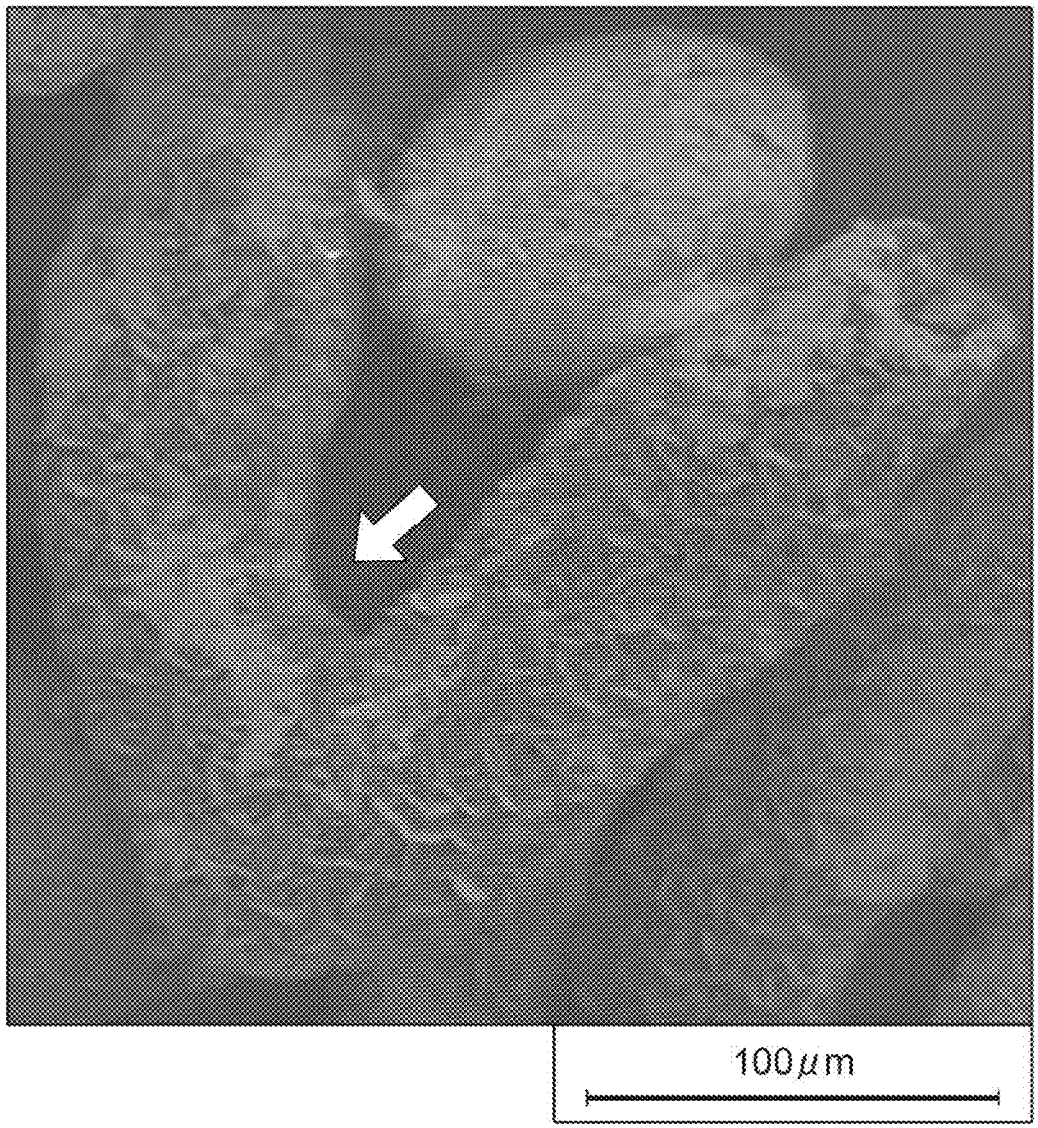
FIG. 5 is a SEM image of boron nitride particles of Example 3.

Particles were generated on the surface of a carbon sheet in the same manner as in Example 2 except that the amount of boric acid blended was changed to 72 parts by mass. As a result of collecting some of the particles generated on the carbon sheet and measuring the particles by X-ray diffraction, only a peak derived from boron nitride was detected, and it was possible to confirm that boron nitride particles were generated. A SEM image of the obtained boron nitride particles is shown in FIG. 5. As a result of obtaining straight lines (perpendicular lines) L1 to L4 and an angle ϕ shown in FIG. 1 and a bending index (=the length of the perpendicular line L2/the length of the straight line L1) for one of the obtained boron nitride particles (a boron nitride particle indicated by an arrow in FIG. 5), the length of the straight line L1 was 109 μm, the length of the perpendicular line L2 was 232 μm, the length of the straight line L3 was 248 μm, the length of the straight line L4 was 233 μm, the angle ϕ was 26°, and the bending index was 2.12.

The invention claimed is:

1. A boron nitride particle which is hollow and has a bent shape, wherein a ratio of a length of a perpendicular line L2 to a length of a straight line L1 is 0.2 or more, wherein the straight line L1 is a straight line connecting a point on one end of the boron nitride particle to a point on the other end, and the perpendicular line L2 is a perpendicular line having a maximum length among perpendicular lines connecting the straight line L1 or an extended line of the straight line L1 to a point on the boron nitride particle, and wherein a first portion extending in a first direction with a length of 50 μm or longer; and a second portion bending from the first portion and extending in a second direction different from the first direction with a length of 50 μm or longer wherein an aspect ratio of the first portion is 12.0 or less, and an aspect ratio of the second portion is 12.0 or less.

2. The boron nitride particle according to claim 1, comprising:

a shell part formed of boron nitride; and a hollow part surrounded by the shell part.

3. A resin composition comprising:

the boron nitride particle according to claim 1 and a resin.

4. A method for producing a resin composition, comprising:

a step of preparing the boron nitride particle according to claim 1; and a step of mixing the boron nitride particle with a resin.

5. The method for producing a resin composition according to claim 4, further comprising:

a step of pulverizing the boron nitride particle.

* * * * *